(12) United States Patent
Newby et al.

(10) Patent No.: US 8,083,517 B2
(45) Date of Patent: Dec. 27, 2011

(54) METHOD OF OPERATING A FURNACE

(75) Inventors: John N. Newby, Newburgh Heights, OH (US); Thomas F. Robertson, Medina Township, OH (US); John J. Nowakowski, Valley View, OH (US)

(73) Assignee: Fives North American Combustion, Inc., Cleveland, OH (US)

( * ) Notice: Subject to any disclaimer, the term of this patent is extended or adjusted under 35 U.S.C. 154(b) by 745 days.

(21) Appl. No.: 12/115,214

(22) Filed: May 5, 2008

(65) Prior Publication Data
US 2009/0246719 A1    Oct. 1, 2009

Related U.S. Application Data

(60) Provisional application No. 61/040,257, filed on Mar. 28, 2008.

(51) Int. Cl.
*F23N 1/02* (2006.01)

(52) U.S. Cl. .......... 431/12; 431/115; 431/216; 431/217; 110/204

(58) Field of Classification Search ............ 431/12, 431/115, 216, 217
See application file for complete search history.

(56) References Cited

U.S. PATENT DOCUMENTS

| | | | | |
|---|---|---|---|---|
| 1,629,253 A | * | 5/1927 | Breese, Jr | 431/63 |
| 1,779,405 A | * | 10/1930 | Atwater | 196/117 |
| 2,086,812 A | * | 7/1937 | Luty | 431/192 |
| 2,959,346 A | * | 11/1960 | Decker | 235/61 R |
| 3,146,821 A | * | 9/1964 | Wuetig | 432/47 |
| 3,202,139 A | * | 8/1965 | Livingston et al. | 122/504 |
| 3,319,692 A | * | 5/1967 | Imants et al. | 431/116 |
| 3,741,166 A | * | 6/1973 | Bailey | 122/23 |
| 4,003,691 A | * | 1/1977 | Wormser | 431/116 |
| 4,182,246 A | * | 1/1980 | Lombana et al. | 110/188 |
| 4,659,305 A | * | 4/1987 | Nelson et al. | 431/9 |
| 4,756,688 A | * | 7/1988 | Hammond et al. | 432/180 |
| 4,926,765 A | * | 5/1990 | Dreizler et al. | 110/234 |
| 4,945,841 A | | 8/1990 | Nakamachi et al. | |
| 5,236,327 A | * | 8/1993 | Flanagan et al. | 431/12 |
| 5,269,679 A | * | 12/1993 | Syska et al. | 431/9 |
| 5,275,554 A | * | 1/1994 | Faulkner | 431/115 |
| 5,368,472 A | | 11/1994 | Hovis et al. | |
| 5,413,477 A | * | 5/1995 | Moreland | 431/9 |
| 5,460,513 A | * | 10/1995 | Flanagan et al. | 431/9 |
| 5,511,971 A | * | 4/1996 | Benz et al. | 431/9 |
| 5,605,452 A | * | 2/1997 | Robertson et al. | 431/8 |
| 5,628,629 A | * | 5/1997 | Mitani et al. | 432/180 |

(Continued)

OTHER PUBLICATIONS

North American Manufacturing Company Bulletin, "TwinBed II Overview", Bulletin 4343, Cleveland, Ohio, Jan. 1999 (2 pages).

(Continued)

*Primary Examiner* — Kenneth Rinehart
*Assistant Examiner* — Jorge Pereiro
(74) *Attorney, Agent, or Firm* — Jones Day

(57) ABSTRACT

A method of firing a burner into a furnace process chamber supplies the burner with fuel and combustion air at a ratio that provides a level of excess air. The method includes the steps of reducing the flow rate of combustion air, and maintaining the level of excess air when the flow rate of combustion air is being reduced. Other steps include withdrawing exhaust gas from the process chamber, and supplying the burner with the exhaust gas at an increasing flow rate when the flow rate of combustion air is being reduced.

37 Claims, 7 Drawing Sheets

U.S. PATENT DOCUMENTS

| | | | |
|---|---|---|---|
| 5,658,139 A * | 8/1997 | Flanagan et al. | 431/7 |
| 5,794,549 A * | 8/1998 | Carter | 110/347 |
| RE36,373 E * | 11/1999 | Benz et al. | 431/9 |
| 6,109,914 A | 8/2000 | Matsuo | |
| 6,126,440 A | 10/2000 | Argent et al. | |
| 6,565,361 B2 * | 5/2003 | Jones et al. | 438/6 |
| 6,685,462 B2 * | 2/2004 | Jones et al. | 431/8 |
| 6,776,609 B1 * | 8/2004 | Sullivan et al. | 431/9 |
| 7,033,544 B2 | 4/2006 | Tesar et al. | |
| 7,104,784 B1 | 9/2006 | Hasegawa et al. | |
| 2002/0197574 A1 * | 12/2002 | Jones et al. | 431/8 |
| 2003/0190570 A1 * | 10/2003 | Jones et al. | 431/8 |

OTHER PUBLICATIONS

PCT/US2009/036878, Notification of Transmittal of the International Search Report and Written Opinion of the International Searching Authority, dated May 4, 2009, 10 pages.

* cited by examiner

METHOD OF OPERATING A FURNACE

RELATED APPLICATIONS

This application claims the benefit of Provisional U.S. Patent Application Ser. No. 61/040,257, filed Mar. 28, 2008, which is incorporated by reference.

TECHNICAL FIELD

This technology relates to burners that fire into a process chamber in a furnace.

BACKGROUND

A process chamber in a furnace is heated by burners that fire into the process chamber. The burners may be provided with fuel in the form of natural gas and oxidant in the form of combustion air. Those reactants are typically provided at flow rates on the air-rich side of the stoichiometric ratio. The excess air ensures that all of the fuel has oxidant available for combustion in the process chamber. The excess air also contributes to the momentum or mass flow of combustion products to promote temperature uniformity throughout the process chamber. However, excess air can lower the efficiency of combustion in the process chamber because it carries heat out with the exhaust gases.

As the temperature in the process chamber reaches increasingly elevated levels, lesser amounts of fuel become necessary to cause further increases in temperature. The burners may then be operated at lower firing rates. The firing rate at a burner can be reduced by reducing the fuel flow rate while maintaining the air flow rate at the original level. This preserves the momentum and temperature uniformity provided by the original air flow rate, but lowers the combustion efficiency as the increasing air-to-fuel ratio includes increasing amounts of excess air. On the other hand, reducing the flow rates of both fuel and air can preserve the efficiency but has the disadvantage of lowering the momentum.

SUMMARY

A method of firing a burner into a furnace process chamber supplies the burner with fuel and combustion air at a ratio that provides a level of excess air. The method includes the steps of reducing the flow rate of combustion air, and maintaining the level of excess air when the flow rate of combustion air is being reduced. Other steps include withdrawing exhaust gas from the process chamber, and supplying the burner with the exhaust gas at an increasing flow rate when the flow rate of combustion air is being reduced.

DETAILED DESCRIPTION

The following description includes examples of how a person of ordinary skill in the art can make and use the claimed invention. It is presented here to meet the statutory requirements of written description, enablement, and best mode without imposing limitations that are not recited in the claims.

Figure 1:
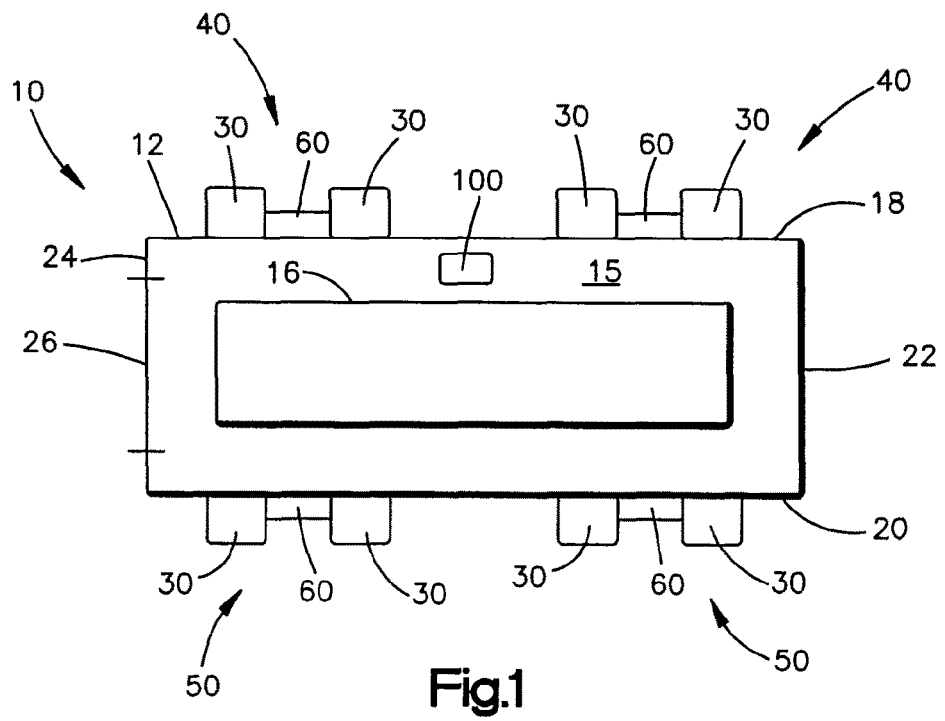
FIG. 1 is a schematic diagram of a furnace with a process chamber and burners that fire into the process chamber.

As shown schematically in FIG. 1, a furnace 10 has a refractory wall structure 12 enclosing a process chamber 15. The process chamber 15 contains a load of material 16 to be heated by the furnace 10. The load of material 16 would typically comprise metal ingots, bars, slabs, or the like. In the illustrated example, the process chamber 15 has a rectangular shape with left and right side walls 18 and 20, an inner end wall 22, and an outer end wall 24 with a door 26. Burners 30 are arranged in opposed pairs 40 and 50 at opposite sides of the process chamber 15. Two pairs 40 of burners 30 are located at the left side wall 18, and two pairs 50 of burners 30 are located at the right side wall 20. Each pair 40 and 50 of burners 30 has a regenerative bed 60.

The left and right burner pairs 40 and 50 are cycled alternately for the burners 30 at one side to fire into the process chamber 15 while the burners 30 at the other side do not. When a burner 30 is fired, it discharges fuel and combustion air into the process chamber 15 for combustion to occur in the process chamber 15. Much of the combustion air supplied to a burner 30 is preheated by driving it through the respective regenerative bed 60. Alternately, when a burner 30 is not fired, exhaust gases from the process chamber 15 are drawn outward through the regenerative bed 60. This heats the regenerative bed 60 which, in turn, heats the combustion air when the burner 30 is once again fired into the process chamber 15.

Figure 2:
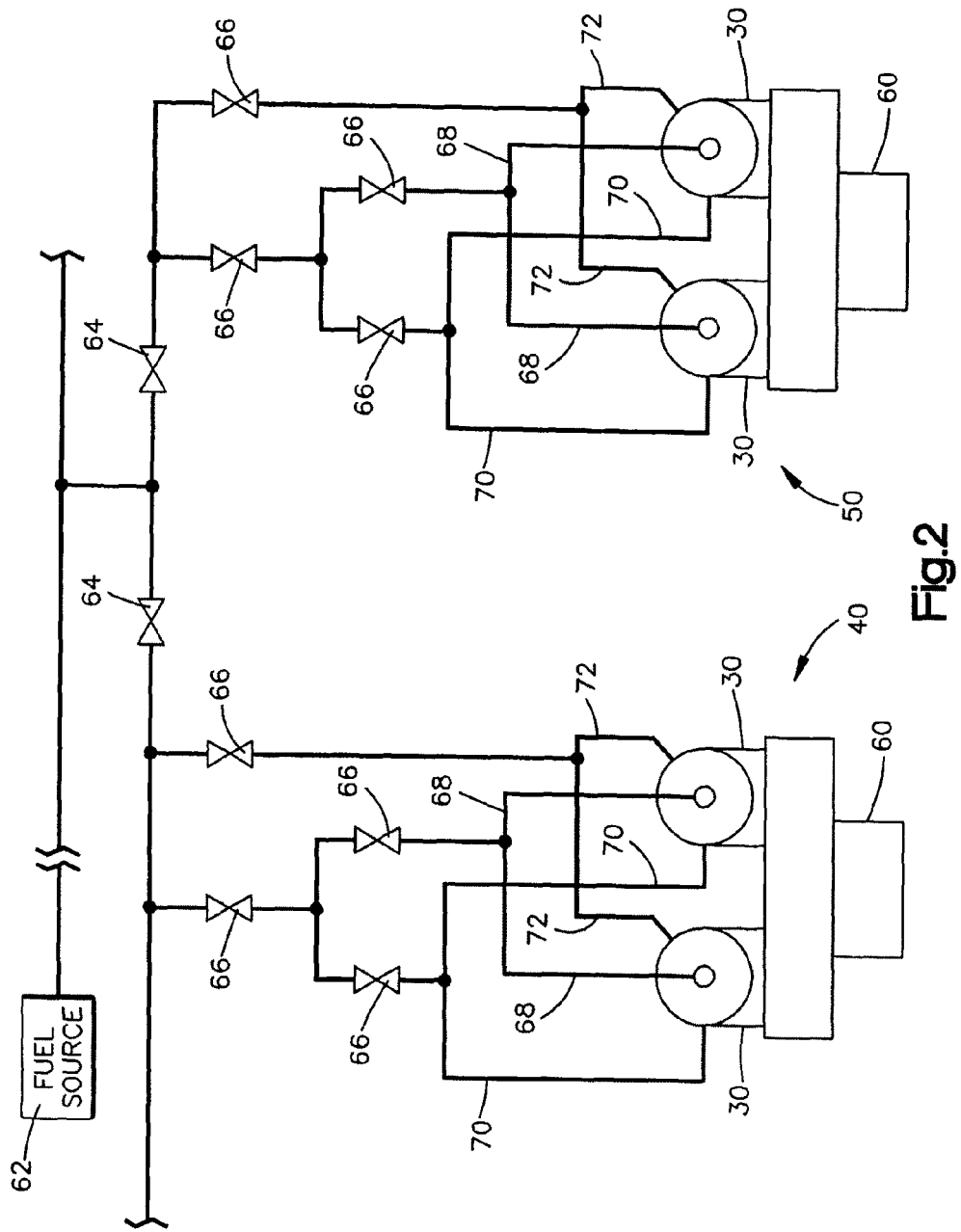
FIG. 2 is a schematic diagram of burners and other parts of the furnace.
Figure 3:
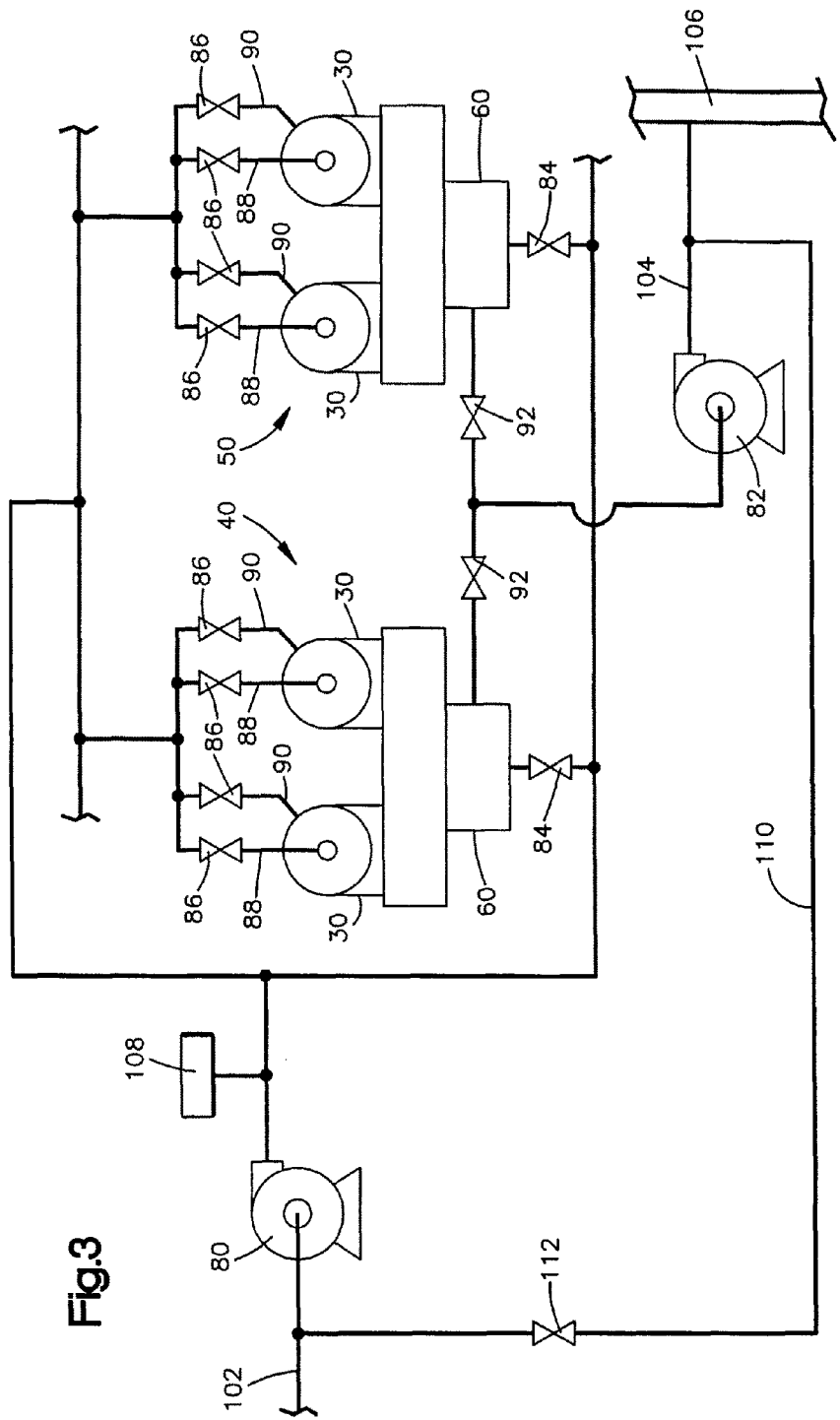
FIG. 3 also is a schematic diagram of burners and other parts of the furnace.

FIG. 2 shows one of the left side burner pairs 40 and one of the right side burner pairs 50. FIG. 3 also shows one of the left side burner pairs 40 and one of the right side burner pairs 50. The burners 30 at both sides of the process chamber 15 are supplied with fuel through lines shown schematically in FIG. 2, and are supplied with combustion air through lines which, for clarity of illustration, are shown separately in FIG. 3.

The fuel source 62 of FIG. 2 is preferably a plant supply of natural gas. The fuel lines convey streams of fuel from the source 62 to the burners 30, and are equipped with switching valves 64 for directing fuel alternately to the left and right burner pairs 40 and 50 as the burners 30 are cycled through the regenerative firing and regenerative exhaust conditions. Additional valves 66 control distinct fuel streams to each individual burner 30. These include a first fuel stream along a first branch line 68, a second fuel stream along a second branch line 70, and a pilot fuel stream along a pilot line 72. The first fuel stream is for firing the burner 30 when the temperature in the process chamber 15 is below the autoignition temperature of the fuel. The second fuel stream is for firing the burner 30 when the temperature in the process chamber 15 is at or above the autoignition temperature. Those fuel streams are preferably delivered to the burner 30 and discharged into the process chamber 15 in the manner and configuration set forth in U.S. Pat. No. 4,945,841, which is incorporated by reference. The pilot fuel stream may be delivered to the burner 30 in any suitable manner and configuration known in the art.

As shown schematically in FIG. 3, the combustion air lines communicate the burners 30 with a pair of blowers 80 and 82. The first blower 80 drives pressurized streams of combustion air to the burner pairs 40 or 50 that are firing at one side of the process chamber 15. The second blower 82 simultaneously withdraws exhaust gases outward through the burner pairs 40 or 50 at the opposite side of the process chamber 15. Specifically, switching valves 84 operate to direct streams of combustion air from the first blower 80 alternately toward the left and right burner pairs 40 and 50 through their regenerative beds 60. The alternating air streams are preferably mixed with the second fuel streams as described in U.S. Pat. No. 4,945,841. Most of the combustion air is supplied to the burner pairs 40 and 50 in that manner. Other valves 86 direct lesser streams of combustion air to the individual burners 30. Those streams continue without alternation between the burner pairs 40 and 50 throughout the regenerative firing and exhaust cycles. Each burner 30 thus receives a cooling air stream on a branch line 88 and a pilot air stream on a pilot line 90. Exhaust valves 92 downstream of the burners 30 allow the second blower 82 to withdraw exhaust gases from the regenerative beds 60 alternately at the left and right side burner pairs 40 and 50.

Accordingly, when the right side burner pairs 40 are shifted from the regenerative firing condition to the regenerative exhaust condition, the switching valves 84 direct combustion air streams from the first blower 80 to switch from the right side burner pairs 40 to the left side burner pairs 50. The exhaust valves 92 also switch conditions so that the second blower 82 can then draw exhaust gases from the process chamber 15 outward through the non-firing burner pairs 40 or 50 and their regenerative beds 60.

Figure 4:
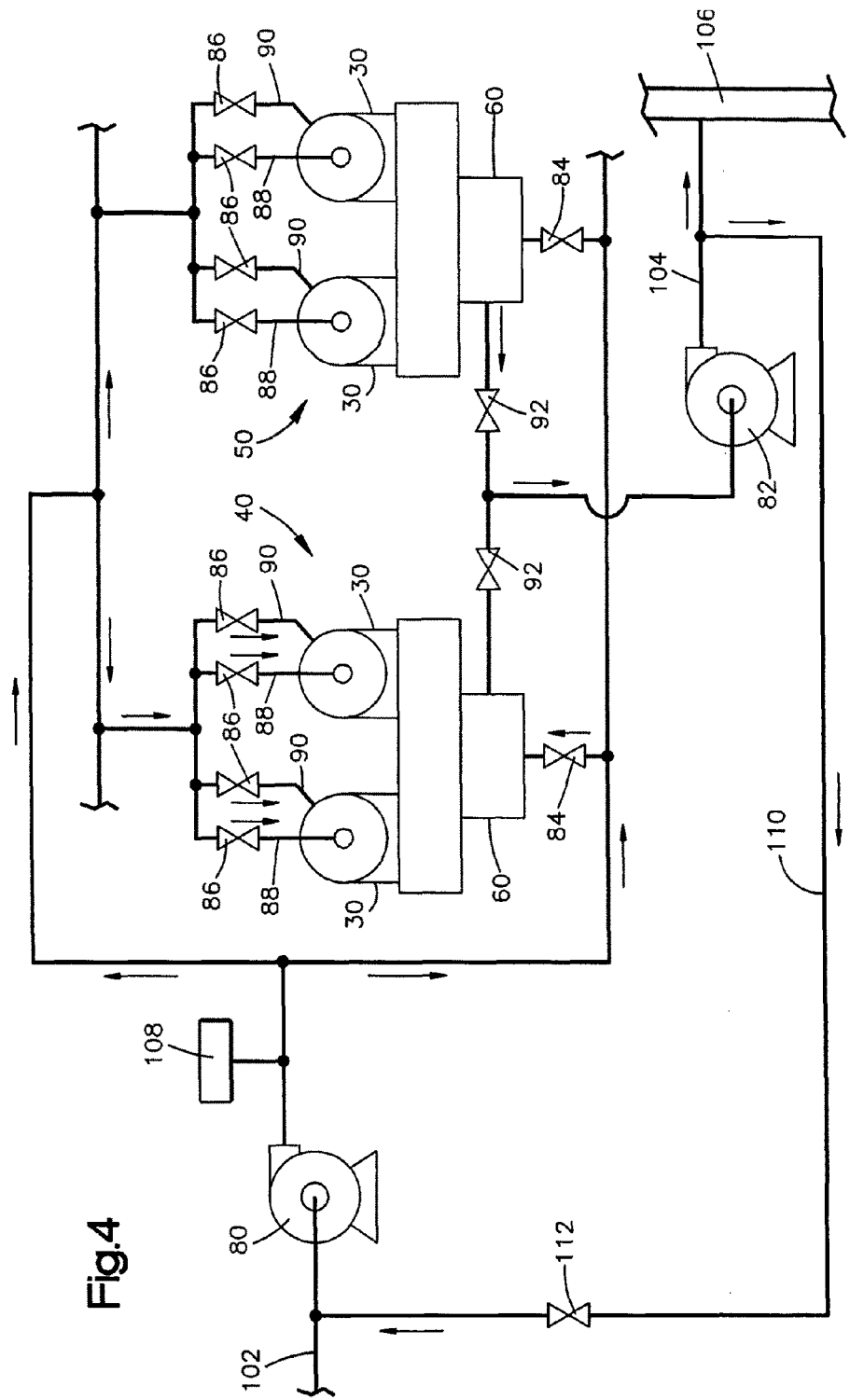
FIGS. 4 and 5 are views similar to FIGS. 2 and 3, with arrows showing reactant flow paths through the furnace.
Figure 5:
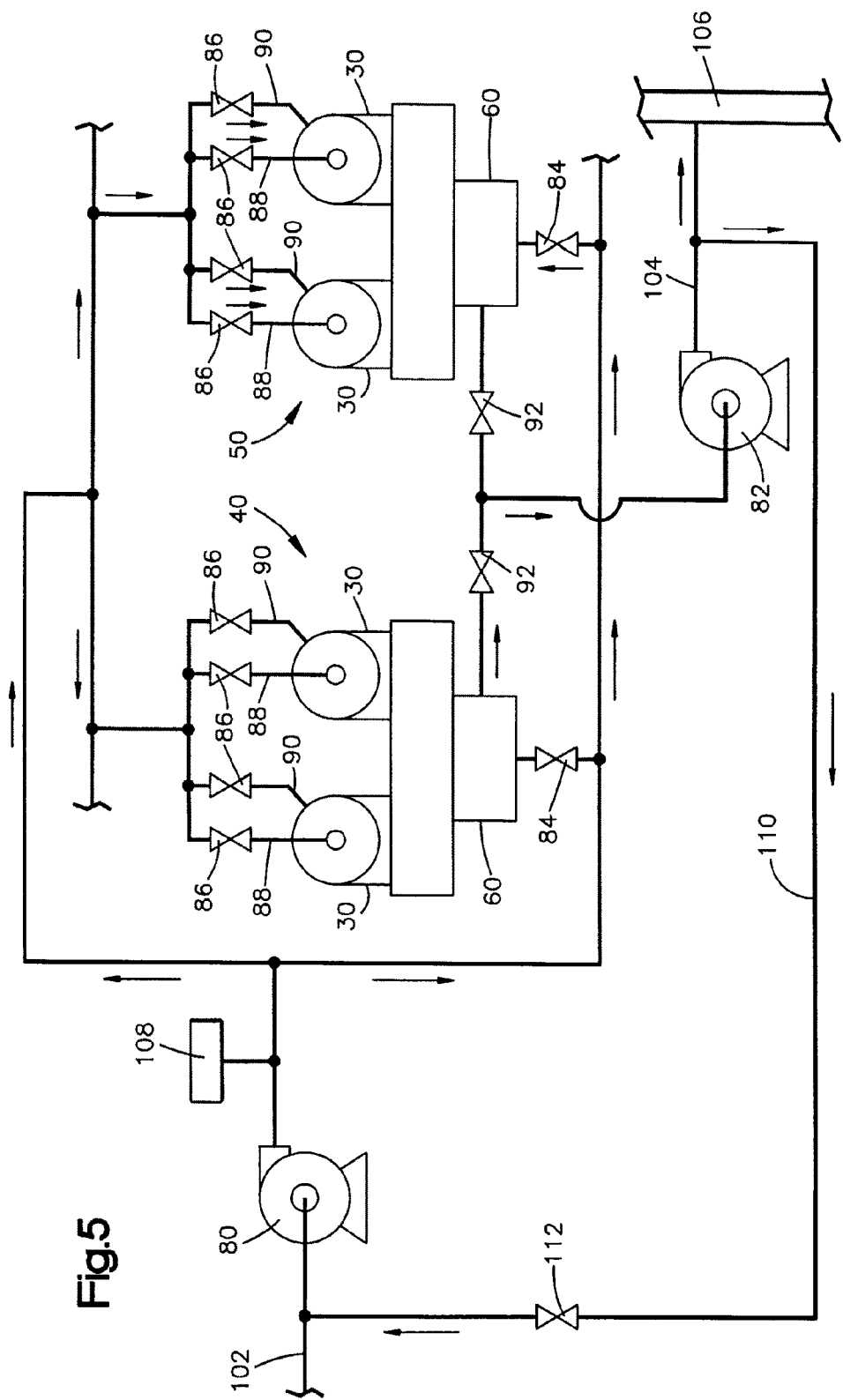

For example, FIG. 4 has arrows to show the flow paths taken by streams of combustion air flowing from the first blower 80 to one of the left side burner pairs 40 as those burner pairs 40 fire into the process chamber 15. FIG. 4 also has arrows to show the flow paths taken by streams of exhaust gases from one of the right side burner pairs 50 as those burner pairs 50 simultaneously exhaust from the process chamber 15. In contrast to the arrows shown in FIG. 4, the arrows shown in FIG. 5 illustrate the alternate flow paths taken by combustion air and exhaust gas when the right side burner pairs 50 fire into the process chamber 15 and the left side burner pairs 40 exhaust from the process chamber 15.

As further shown schematically in FIG. 1, the furnace 10 has a temperature sensor 100 in the process chamber 15. The combustion air lines of FIG. 3 include a supply line 102 that feeds atmospheric air to the first blower 80, and an exhaust line 104 that conveys exhaust gases from the second blower 82 to a flue 106. An oxidant sensor 108 is located between the first blower 80 and the burners 30. A recirculation line 110 extends from the exhaust line 104 to the supply line 102 to introduce a stream of exhaust gases into the combustion air that is driven to the burners 30 by the first blower 80. The recirculation line 110 is equipped with a valve 112 to control the flow of exhaust gas that is thus recirculated through the burners 30 and the combustion chamber 15.

Figure 6:
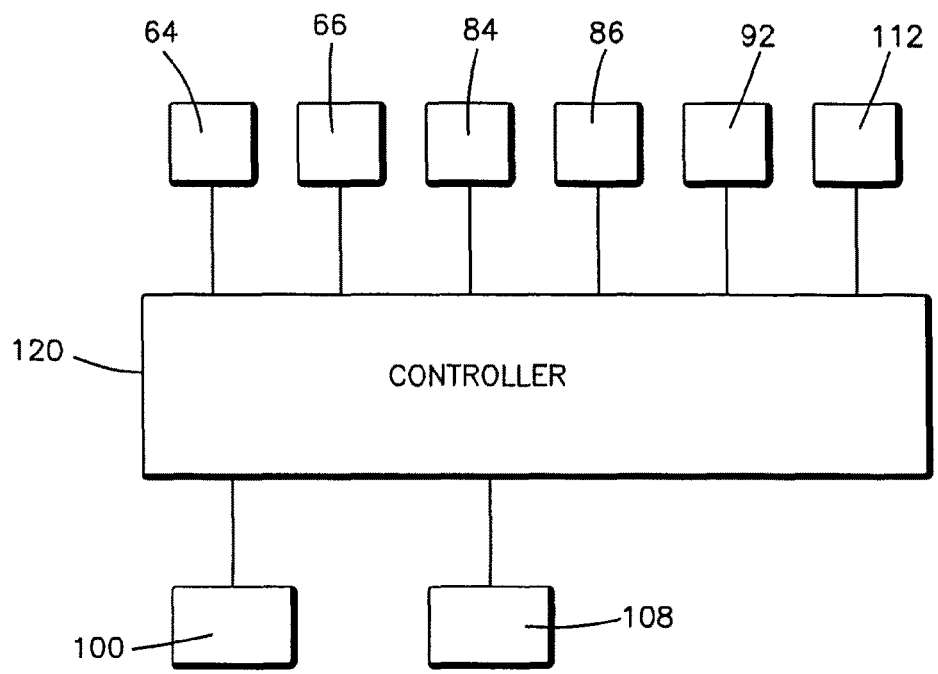
FIG. 6 is a schematic diagram of a controller and other parts of the furnace.

A controller 120 is shown schematically in FIG. 6. The controller 120, which may comprise any suitable programmable logic controller or other control device, has hardware and/or software configured to operate the fuel valves 64 and 66, the air valves 84 and 86, and the exhaust valves 92 to supply the burners 30 with the reactant streams described above. The controller 120 is further configured to operate the recirculation valve 112 in response to the temperature sensor 100 and the oxidant sensor 108 to vary the reactant streams with reference to the temperature and oxidant content of the process chamber 15.

Figure 7:
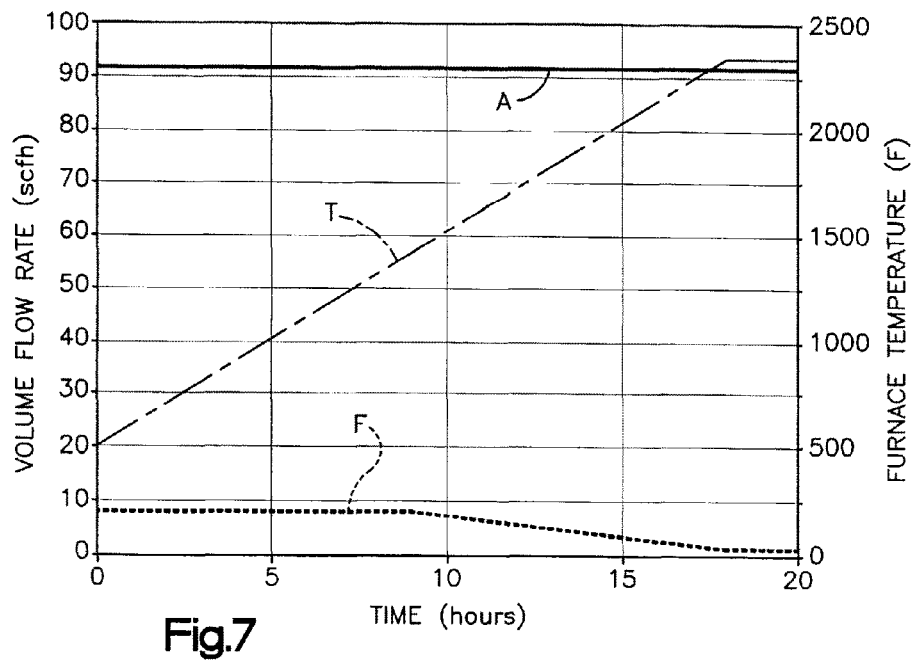
FIGS. 7, 8 and 9 are graphs showing three different examples of operating conditions for the furnace.
Figure 8:
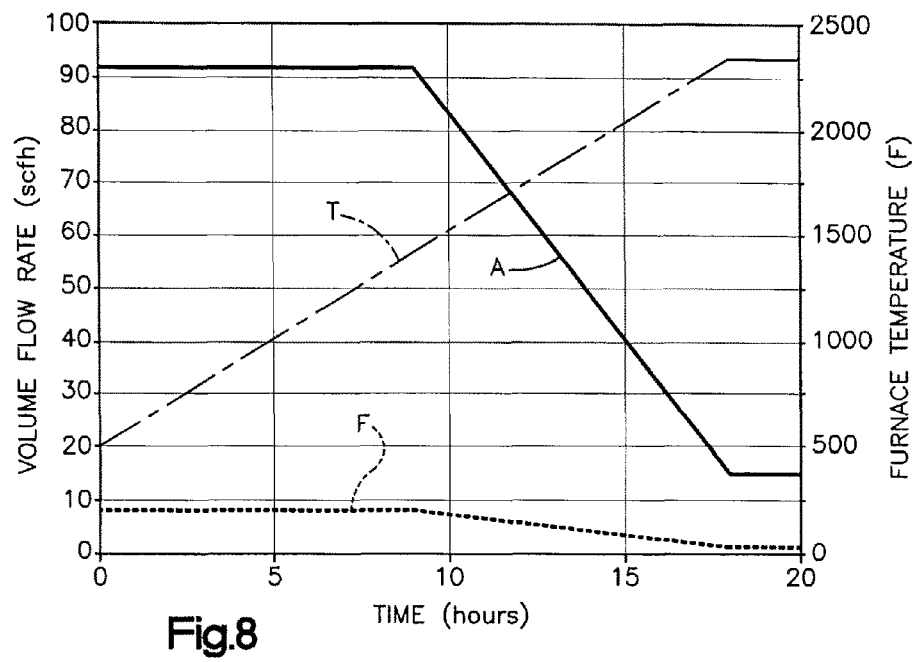
Figure 9:
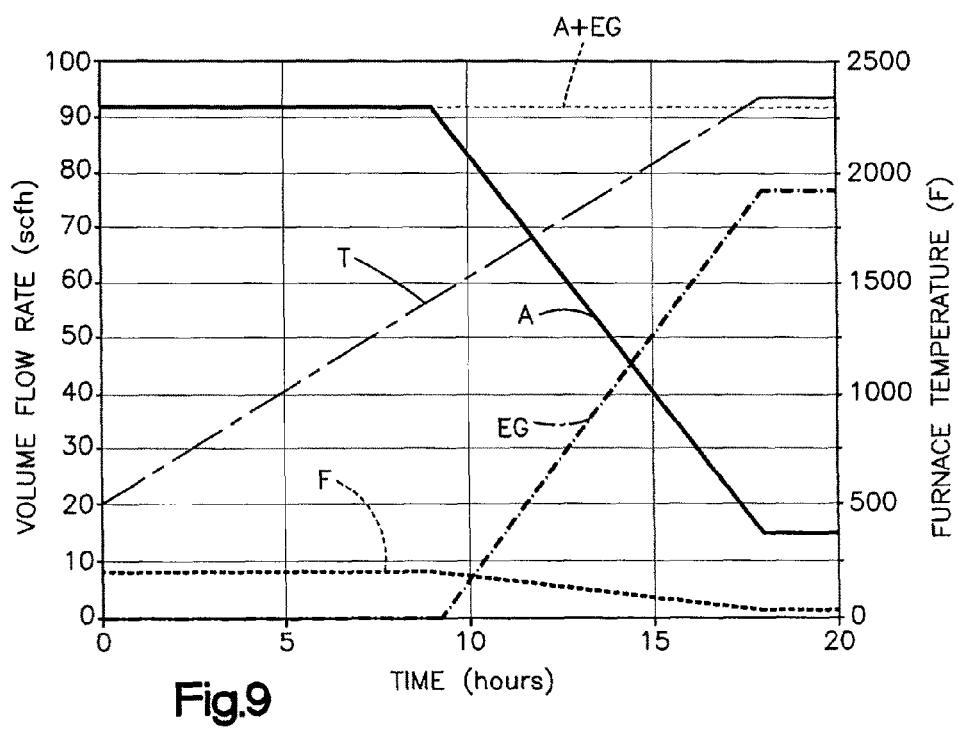

FIGS. 7-9 illustrate differing conditions in which the furnace 10 can be operated. In each of these three examples, the temperature in the process chamber 15 is raised to a setpoint temperature of 2,300° F. in 18 hours. This is indicated by the temperature line T that is common to FIGS. 7, 8 and 9.

In the example of FIG. 7, the controller 120 initially provides the burners 30 with combustion air and fuel at a ratio of 11 to 1. This is indicated by the air and fuel lines A and F. Since the stoichiometric ratio of atmospheric air to natural gas is about 10 to 1, the initial ratio includes 10% excess air to ensure complete combustion of the fuel. As the temperature reaches elevated levels, less fuel is needed to cause further increases in the temperature. Therefore, the controller 120 responds to the temperature sensor 100 by reducing the firing rate at the burners 30. In the example of FIG. 7, this reduction begins when the temperature reaches 1,300° F., and is accomplished by reducing the flow rate of fuel supplied to the burners 30. The fuel line F then begins to decline from the initial flow rate at about 9 hours, and continues to decline until the temperature reaches the setpoint of 2,300° F. at 18 hours.

Although the fuel flow rate is reduced in the example of FIG. 7, the air flow rate is not. Since the air flow rate is a multiple of the fuel flow rate, the momentum of gases flowing through the combustion chamber 15 is provided almost entirely by the air. The constant flow rate of air thus provides nearly constant momentum of gases flowing through the combustion chamber 15 even though the flow rate of fuel is decreased. The sustained momentum of flowing gases helps to promote temperature uniformity throughout the process chamber 15 for uniform heating of the load 16. However, the constant flow rate of air has the effect of increasing the percentage of excess air as the flow rate of fuel decreases. The increasing percentages of excess air can have the undesirable effect of reducing combustion efficiency.

The loss of combustion efficiency that occurs under the conditions of FIG. 7 can be avoided by operating the furnace 10 under the conditions shown in FIG. 8. As indicated by the air line A in FIG. 8, the flow rate of combustion air to the process chamber 15 is reduced simultaneously with the flow rate of fuel. The reduction of air is controlled to maintain an air-to-fuel ratio equal to or substantially equal to the original ratio of 11 to 1, and thereby to maintain the percentage of excess air at or about the original level of 10%. Operating tolerances may cause the level of excess air to vary within a range that does not depart substantially from the original level of 10%. Alternatively, the level of excess air could be maintained within a limited range. Such a range of excess air could extend from about 2% to about 50%, but would preferably extend only from about 5% to about 20%, and most preferably would extend only from about 8% to about 12%. Controlling the air flow rate in this manner maintains the combustion efficiency by avoiding a substantial increase in excess air, but has the undesirable effect of losing the momentum and temperature uniformity provided by the greater levels of excess air shown in FIG. 7.

The operating conditions shown in FIG. 9 overcome the efficiency loss of FIG. 7 as well as the momentum loss of FIG. 8. As in the example of FIG. 8, when the flow rates of air and fuel are reduced in the example of FIG. 9, they are controlled to maintain an air-to-fuel ratio with a level of excess air at or about 10%. This maintains the combustion efficiency of the FIG. 8 conditions. The momentum of the FIG. 7 conditions is maintained in FIG. 9 by supplying the burners 30 with exhaust gas, as indicated by the exhaust gas line EG. The exhaust gas could be supplied earlier or later than indicated in FIG. 9, but in this particular example the controller 100 operates the recirculation valve 112 to withhold exhaust gas from the supply line 102 until the flow rates of air and fuel are first reduced from their initial rates. The exhaust gas is then introduced into the supply line 102, and is provided continuously throughout the entire range of reduced air flow rates. The flow rate of exhaust gas preferably increases continuously while the air flow rate decreases, and at any particular time is most preferably equal to the difference between the initial air flow rate and the reduced air flow rate. This maintains the sum of the air and exhaust gas flow rates at a constant level that is equal to the initial air flow rate. The constant sum of air and exhaust gas flow rates is indicated in FIG. 9 by the line A+EG, which shows that the FIG. 9 conditions provide the same momentum as the FIG. 7 conditions. Although the controller 120 most preferabley seeks a constant sum as indicated ideally by the line A+EG in the illustrated example, operating tolerances may cause the sum of air and exhaust gas flow rates to vary within a range that does not depart substantially from the initial air flow rate, and satisfactory results could be obtained by allowing the sum to vary within a range that does not reach more than about 15% below the initial air flow rate.

The patentable scope of the invention is defined by the claims, and may include other examples of how the invention can be made and used. Such other examples, which may be available either before or after the application filing date, are intended to be within the scope of the claims if they have structural or method elements that do not differ from the literal language of the claims, or if they have equivalent structural or method elements with insubstantial differences from the literal language of the claims.

The invention claimed is:

1. A method of firing a burner into a furnace process chamber, comprising:
   supplying the burner with fuel and combustion air at a ratio that provides a level of excess air;
   reducing the flow rate of combustion air to the burner;
   maintaining the level of excess air when the flow rate of combustion air is being reduced;
   withdrawing exhaust gas from the process chamber; and
   supplying the burner with the exhaust gas at an increasing flow rate when the flow rate of combustion air is being reduced.

2. A method as defined in claim 1 wherein the level of excess air is maintained at or about 10%.

3. A method as defined in claim 1 wherein the level of excess air is maintained within the range of about 8% to about 12%.

4. A method as defined in claim 1 wherein the level of excess air is maintained within the range of about 5% to about 20%.

5. A method as defined in claim 1 wherein the level of excess air is maintained within the range of about 2% to about 50%.

6. A method as defined in claim 1 wherein the sum of the flow rates of combustion air and exhaust gas to the burner is maintained when the flow rate of exhaust gas is increasing.

7. A method as defined in claim 1 wherein the flow rate of combustion air is reduced throughout a range, and the burner is supplied with the exhaust gas at an increasing flow rate throughout the range.

8. A method as defined in claim 1 wherein the exhaust gas is withheld from the burner before the flow rate of combustion air is reduced.

9. A method as defined in claim 1 wherein the exhaust gas is supplied to the burner from a regenerative bed.

10. A method of firing a burner into a furnace process chamber, comprising:
    supplying the burner with a flow rate of fuel and a flow rate of combustion air at a ratio that provides a level of excess air;
    firing the burner throughout a range of firing rates by varying the flow rate of fuel and the flow rate of combustion air;
    maintaining the level of excess air when the flow rates of fuel and combustion air are being varied;
    withdrawing exhaust gas from the process chamber; and
    supplying the burner with the exhaust gas at a flow rate that varies inversely relative to the flow rate of combustion air when the flow rate of combustion air is being varied.

11. A method as defined in claim 10 wherein the level of excess air is maintained at or about 10%.

12. A method as defined in claim 10 wherein the level of excess air is maintained within the range of about 8% to about 12%.

13. A method as defined in claim 10 wherein the level of excess air is maintained within the range of about 5% to about 20%.

14. A method as defined in claim 10 wherein the level of excess air is maintained within the range of about 2% to about 50%.

15. A method as defined in claim 10 wherein the sum of the flow rates of combustion air and exhaust gas to the burner is maintained when the flow rate of exhaust gas is being varied.

16. A method as defined in claim 10 wherein the flow rate of combustion air is varied continuously throughout the range of firing rates.

17. A method as defined in claim 16 wherein the flow rate of fuel is varied continuously through the range of firing rates.

18. A method as defined in claim 17 wherein the flow rates of fuel and combustion air are reduced in response to an elevated temperature in the process chamber.

19. A method as defined in claim 10 wherein the exhaust gas is withheld from the burner before the flow rate of combustion air is reduced.

20. A method as defined in claim 10 wherein the exhaust gas is supplied to the burner from a regenerative bed.

21. A method of firing a burner into a furnace process chamber, comprising:
    supplying the burner with fuel and combustion air at a ratio that provides a level of excess air;
    reducing the flow rate of combustion air from a first flow rate to a second flow rate;
    maintaining the level of excess air when the flow rate of combustion air is being reduced;
    withdrawing exhaust gas from the process chamber; and
    when supplying the burner with combustion air at the second flow rate, further supplying the burner with the exhaust gas at a third flow rate equal to the difference between the first and second flow rates.

22. A method as defined in claim 21 wherein the level of excess air is maintained at or about 10%.

23. A method as defined in claim 21 wherein the level of excess air is maintained within the range of about 8% to about 12%.

24. A method as defined in claim 21 wherein the level of excess air is maintained within the range of about 5% to about 20%.

25. A method as defined in claim 21 wherein the level of excess air is maintained within the range of about 2% to about 50%.

26. A method as defined in claim 21 wherein the flow rate of combustion air is reduced from the first flow rate to the second flow rate in response to a temperature increase in the process chamber.

27. A method as defined in claim 21 wherein the exhaust gas is withheld from the burner before the flow rate of combustion air is reduced.

28. A method as defined in claim 21 wherein the exhaust gas is supplied to the burner from a regenerative bed.

29. A method of firing a burner into a furnace process chamber, comprising:
supplying the burner with a flow rate of fuel and a flow rate of combustion air at a ratio that provides a level of excess air;
monitoring a temperature in the process chamber;
responding to an increase in the monitored temperature by reducing the flow rate of fuel and the flow rate of combustion air;
maintaining the level of excess air when the flow rate of fuel and the flow rate of combustion air are being reduced;
withdrawing exhaust gas from the process chamber; and
further responding to the temperature increase by supplying the burner with the exhaust gas at an increasing flow rate when the flow rate of combustion air is being reduced.

30. A method as defined in claim 29 wherein the level of excess air is maintained at or about 10%.

31. A method as defined in claim 29 wherein the level of excess air is maintained within the range of about 8% to about 12%.

32. A method as defined in claim 29 wherein the level of excess air is maintained within the range of about 5% to about 20%.

33. A method as defined in claim 29 wherein the level of excess air is maintained within the range of about 2% to about 50%.

34. A method as defined in claim 29 wherein the sum of the flow rates of combustion air and exhaust gas to the burner is maintained when the flow rate of exhaust gas is being varied.

35. A method as defined in claim 29 wherein responding to the temperature increase includes reducing the flow rates of fuel and combustion air throughout a range of increases in the monitored temperature, and further includes maintaining the sum of the flow rates of combustion air and exhaust gas to the burner throughout the range of increases in the monitored temperature.

36. A method as defined in claim 29 wherein the exhaust gas is withheld from the burner before the flow rate of combustion air is reduced.

37. A method as defined in claim 29 wherein the exhaust gas is supplied to the burner from a regenerative bed.

* * * * *